United States Patent Office 3,033,691
Patented May 8, 1962

3,033,691
MEAT TENDERIZING COMPOSITIONS
Carl V. Smythe, Moorestown, N.J., and Clifford E. Neubeck, Hatboro, and Ernest A. Robbins, Bristol, Pa., assignors to Rohm & Haas Company, Philadelphia, Pa., a corporation of Delaware
No Drawing. Filed Aug. 26, 1959, Ser. No. 836,083
7 Claims. (Cl. 99—222)

This invention relates to protein-splitting enzymic aqueous compositions and to the corresponding gastronomically acceptable pressure-dispensed sprayable compositions. The compositions comprise, in specific amounts, protease enzyme, propylene glycol, sodium chloride, and dextrose. They are ideally suited for meat tenderizing.

Enzymes are complex organic catalysts which promote specific organic reactions. However, this desirable catalytic activity is adversely affected by a large number of factors, often the very factors which also accelerate the enzyme activity. Accordingly, for many years workers in this field have endeavored to preserve the enzyme activity for optimum effect on the substrate to be treated. But, the type and amounts of agents that have been proposed to this end have differed greatly in view of the specificity of the enzymes and the conditions under which enzyme activity was desired. Consequently, contributions in this field have been rather sporadic, each problem requiring a specific solution that has shed little light, if any, on further advances. In the manufacture of bread, protease and diastase enzymes have been compounded into thick sirups of glucose or glycerol which, by their dehydrating action, minimize hydrolyzation of the enzymes while by their nutritive properties they promote the growth of yeast. In dry and granular compositions containing protein-splitting enzymes, one has resorted to sodium chloride as a carrier, which by physically encasing and absorbing the enzymes has minimized the breakdown the enzyme normally suffers from mere exposure to atmospheric conditions. Other isolated and haphazard attempts to preserve the valuable enzymic activity are reported in the art.

Yet, by a more critical examination of the art concerning protein-splitting enzymes in aqueous solution, one discerns a tendency to resort to one stabilization additive at a time. While one additive used singly under a set of specific conditions may have some beneficial effect, the addition of another additive upsets the carefully devised conditions to the extent of often minimizing the value of each individual additive and even to the point of completely inhibiting enzymic activity. Hence, the combined effect of two additives on solutions of protein-splitting enzymes has been unpredictable from the effect of a single additive on a specific enzymic system.

This was essentially the state of the art, when with the sudden and recent expansion in aerosol-dispensed products, it became necessary to develop a liquid protein-splitting enzyme preparation that would be ideally suited for dispensing from a pressurized container for use on meat. Such compositions must be gastronomically acceptable, this requirement sharply limiting the type of ingredients employed. The composition must be liquid; it must retain its protein-splitting activity over a great variety of conditions and over long periods of non-refrigerated storage; and it must possess a high degree of heat stability. Though not sterilizable by heat, since this would cause enzymic inactivation, the composition must inhibit development of microbiological contamination. Moreover, it must be freely sprayable into a fine mist from the aerosol container, this requirement creating further obstacles in the type and proportions of ingredients employed. The composition must also be compatible with the propellants with which the container is pressurized. When confronted with these numerous problems, it was discovered that only a very specific composition had the requisite attributes.

The composition of the invention is a liquid aqueous composition which comprises, in admixture, on a weight per volume basis, 1 to 15% of protein-splitting enzymes, 5 to 20% of 1,2-propylene glycol, 3.0 to 17% of sodium chloride, 1 to 44% of dextrose, and the remainder being water; the pH of said composition ranging from 5 to 6.0. In addition to these essential ingredients in the specified amounts, a number of optional adjuvants may be admixed, such as monosodium glutamate, flavoring, essential oils as those derived from garlic, pepper, and the like. This composition meets the requirements outlined above, including ideal suitability for modern aerosol dispensing methods. Its desirable properties are attributable to interdependence and coaction of the specific ingredients in the amounts specified.

This is evident from the fact that, whereas propylene glycol has an initial beneficial effect on stabilizing the composition, increasing amounts of propylene glycol cause a decrease in enzymic activity. The effect of increasing proportions of sodium chloride is a sudden and unexpected drop in stability of the composition, whereas its complete omission is also deleterious. The effect of glucose is another new factor that further sharply limits the ingredients to the amounts specified.

The protein-splitting enzymes that are employed in accordance with the invention are commonly named proteolytic enzymes. They are well known in the art, numerous methods being described to obtain them conveniently, including submerged and tray cultures. Descriptions are found in U.S. Patent 2,530,210, which is incorporated herein by reference. The Chemistry and Technology of Enzymes, by H. Tauber, chapter 22, pages 398–402, and Economic Botany, vol. 5, No. 2 (1951), "Microbiological Production of Enzymes and Their Industrial Applications," further discuss protease production, including microorganisms suitable therefor. Amongst the various available proteases, those of microbial origin, such as of fungal or bacterial origin, are preferred because the compositions derived therefrom tenderize the tougher portions of meat without development of mushiness or of off-flavors and with preservation of the desired texture and firmness of the meat.

As is well known in the art, protease may be obtained by growing a protease-producing microorganism in the presence of a suitable nutrient medium such as crushed cereal grains as from wheat, corn, and the like. Optionally, supplementary proteinaceous material may be used such as soybean, cottonseed, or peanut meal. With the nutrient medium, there is supplied water and oxygen in amounts adequate for the growth of the microorganism. In submerged cultures, the nutrient medium may be dispersed in water and gaseous oxygen is supplied as the medium is agitated. In tray cultures, the water content is approximately 40 to 60%, the air providing the oxygen supply. Generally, the cool sterile nutrient medium is then inoculated with a heavy spore culture of a suitable microorganism, such as a culture of an Aspergillus, such as *Aspergillus oryzae*, *Aspergillus luchuensis*, *Aspergillus tamarii*, *Aspergillus flavus*, and *Aspergillus ochraceous*; or of a bacterium, such as *Bacillus subtilis*. The inoculated medium is maintained within a temperature of 20° to 40° C. until maximum development of protease activity. The enzymes produced may be harvested by any convenient isolation method. In submerged methods, the insoluble materials are separated from the liquid portion which contains the active enzymic components. From tray cultures, enzyme extracts may be obtained with water from the growth medium. The extract as such may be used as a source of protease or it may be treated with alcohol to precipitate the protease from the solution, centrifuged, and the product dried. The powder is suitable for the preparation of the protease composition as further described below. Protease powdered compositions are also available commercially.

In the preparation of the compositions of the invention, the ingredients are blended in the proportions specified with adjustment of the pH. Conveniently, the compositions may be compounded by dissolving dextrose in water, followed by admixture of the sodium chloride, the enzyme, and the propylene glycol. The final proportion of each component is, on a weight per volume basis, 1 to 44%, preferably 16 to 32%, of dextrose; 3 to 17%, preferably 3 to 5%, of sodium chloride; 5 to 20%, preferably 5 to 15%, of propylene glycol; and 1 to 15%, preferably 2 to 8%, of enzyme. The final pH is preferably adjusted to the range of 5 to 6 with an acidic agent, preferably an organic acid as lactic acid, acetic acid, benzoic acid, citric acid, and the like.

The resulting liquid composition is valuable in numerous applications where it is desired to split proteins. It is of special value in tenderizing meat with which it is contacted by any suitable manner as by spraying, brushing, or immersion.

Temperatures are maintained at a range favoring optimum enzyme activity, as from 50° to 122° F., the present compositions exhibiting unusual enzymic stability in the upper range as of about 86° to 105° F., with attendant rapid and efficacious enzymic activity on the substrate.

Another embodiment of the invention is directed to gastronomically acceptable liquid sprayable compositions which comprises the specific ingredients defined above and which are dispensed from containers by a propellant under pressure. Conveniently, such compositions are referred to as aerosols. These compositions are ideally suited for commercial as well as home meat tenderizing. They are referred to as gastronomically acceptable in the sense that the products treated with the compositions are edible. Optionally, they may be inactivated or inhibited by any suitable procedure. The containers suitable for packaging these compositions may be made of glass, plastic, or metal that may be coated with enamel or with resinous material, as polyvinyl resins to prevent product-metal reaction. The cans are charged with the desired amount of liquid enzyme composition; they are then fitted with a dispensing valve by crimping the valve to the cans. The cans are charged with a suitable propellant under the desired pressure, as in the range of 70 to 130 p.s.i. Suitable propellants should be inert with respect to the enzyme compositions. They include nitrous oxide, carbon oxide, nitrogen, and suitable propellants of the fluorinated hydrocarbon (Freon) type, as trifluorochloromethane or octafluorocyclobutane, such propellants being available commercially under the trade names of Freon and Genetron, and mixtures of propellants.

The aerosol composition is stable for extensive periods of storage without refrigeration, though no heat sterilization is employed in its manufacture, this aspect being attractive for distribution and sale through conventional commercial channels. Also, the aerosol enzyme composition inhibits microbiological growth. It provides an attractive and convenient method to apply meat-tenderizer on meats of all kinds.

The invention is further illustrated by the following non-limitative illustrations of the compositions of the invention and their utility for the tenderization of meat.

Preparation of a liquid proteolytic enzyme composition: There is admixed to 63.2 ml. of water 32 grams of dextrose, 10 grams of sodium chloride, 5 grams of fungal protease enzyme powder, and 10 grams of propylene glycol.

The composition is brushed liberally onto the meat. After 2½ hours at 83° F., the meat has retained its original attractive appearance, no off-odors being noted. After cooking, the meat is tender and tasty.

The protease activity of the protease composition may be conveniently determined by adapting the method of R. B. Koch and C. J. Ferrari in Cereal Chemistry, vol. 32, pages 254–269 (1955), entitled "Investigation of Proteolytic Enzymes by a Gelatin Viscosity Method." The method proceeds as follows:

Twenty ml. of a 6% solution of 225–Bloom gelatin in 0.2 molar acetate buffer (sodium acetate and acetic acid) of pH 4.7 is mixed with 2 ml. of a suitably diluted protease enzyme solution and incubated at 40° C. for 30 minutes. The viscosity of the treated gelatin substrate is determined in a viscosity pipette and compared to the viscosity obtained on a substrate treated with 2 ml. of water instead of the 2 ml. of enzyme solution. The enzyme solution, 2 ml. of which give a 50% decrease in gelatin viscosity in 30 minutes at 40° C. at a pH of 4.7, is then assigned the value of 36 protease activity units.

The activity of any proteolytic enzyme solution may be conveniently determined by the following formula:

Activity per gram of enzyme solution $$= \frac{36 \times 1000}{\text{mg. of enzyme to give a 50\% decrease in gelatin viscosity}}$$

The stability of typical compositions of this invention is demonstrated in the following Tables I and II:

Liquid preparations prepared as described above are incubated in glass vials at the desired incubation temperature. The activity test is repeated at intervals during the testing period to determine the amount of activity retained after subjection to the elevated temperature.

TABLE I

*Heat Stability of the Enzyme Compositions*

| Composition | Ingredients, Percent Weight per Volume | | | | Enzymic Activity (Hours at 104° F.) |
|---|---|---|---|---|---|
| | Enzyme | NaCl | Propylene Glycol | Dextrose | |
| 1 | 5 | 6.9 | 10 | 32 | 1,070 |
| 2 | 5 | 10 | 0 | 0 | 173 |
| 3 | 5 | 10 | 5 | 32 | 864 |
| 4 | 5 | 3.85 | 10 | 32 | 1,220 |
| 5 | 5 | 3.85 | 10 | 24 | 624 |
| 6 | 5 | 3.85 | 10 | 0 | 274 |
| 7 | 5 | 3.85 | 25 | 0 | 48 |
| 8 | 5 | 0 | 25 | 0 | 72 |
| 9 | 5 | 0 | 0 | 0 | 72 |

Stability of the enzyme composition is measured by determining the number of hours it takes for the composition to lose 50% of its original enzymic activity. The pH of all compositions was 5.5

Compositions 8 and 9 showed increasing bacterial development. Enzymic activity rapidly further drops after 72 hours.

From the data, it is apparent that the compositions 1, 3, 4, and 5 of the inventions are stable for several weeks; whereas compositions 2, 6, 7, 8, and 9, differing in one or more aspects from those of the invention rapidly lose their activity.

By varying the enzyme proportions from 1 to 15%, corresponding stabilization is obtained.

Instead of glucose, there may be substituted in toto or in part carbohydrates such as lactose, sucrose, and/or corn sirup, i.e., a hydrolytic mixture of dextrose, maltose, and dextrins, with equivalent results.

TABLE II

*Heat Stability at Higher Temperature*

| Composition | Ingredients, Percent Weight per Volume | | | | Enzymic Activity (Hours at 108.5° F.) |
|---|---|---|---|---|---|
| | Enzyme | NaCl | Propylene Glycol | Dextrose | |
| 10 | 5 | 10 | 0 | 0 | 125 |
| 11 | 5 | 10 | 10 | 0 | 118 |
| 12 | 5 | 10 | 5 | 16 | 300 |
| 13 | 5 | 3.85 | 10 | 16 | 420 |
| 14 | 5 | 6.9 | 5 | 32 | 706 |
| 15 | 5 | 23 | 0 | 0 | 38 |

The data demonstrate again that compositions 12, 13, and 14 of the invention have greatly improved stability over compositions failing in the proper selection and/or amounts of ingredients.

Monosodium glutamate is admixed in amounts of 0.1 to 2% to compositions 12, 13, and 14. Identical stability results are obtained.

These data, together with similar data obtained during this work, permit one to distinguish the compositions of the invention as compositions which retain at least 50% of their original enzymic activity when subjected to a temperature of 108.5° F. for 5 days. This is a reliable screening test that may be used to set apart the compositions of the invention from any others.

*Aerosol compositions.*—Fifty 8-ounce metal cans lacquered with a vinyl resin are charged with 5 ounces of a composition of the following composition.

Ingredients: Amounts (w./v.)
- Protease enzyme — 5
- NaCl — 3.85
- Propylene glycol — 13
- Dextrose — 32
- Monosodium glutamate — 1

The pH is adjusted to 5.5 with 0.5 ml. of glacial acetic acid. The valves of the cans are crimped, and the cans are filled with nitrous oxide at 80 p.s.i. pressure.

The compositions are freely sprayed onto meat, ready passage through the valve being obtained with complete freedom of clogging. The cooked meat had improved tenderness and better flavor. These aerosol compositions were stable for over six weeks, the major part of enzymic activity being retained even though they were under non-refrigerated storage.

We claim:

1. A composition comprising, on a weight per volume basis, 1 to 15% protease, 5 to 20% propylene glycol, 3 to 17% sodium chloride, and 1 to 44% dextrose in water, said composition having a pH of 5 to 6.

2. The composition of claim 1 in which the protease is of microbiological origin.

3. A composition comprising, on a weight per volume basis, 1 to 15% protease, 5 to 20% propylene glycol, 3 to 17% sodium chloride, 1 to 44% dextrose in water, and at least one edible adjuvant, said composition having a pH of 5 to 6.

4. A composition comprising, on a weight per volume basis, 2 to 8% protease, 5 to 15% propylene glycol, 3 to 5% sodium chloride, 16 to 32% dextrose, and a flavoring ingredient in water, said composition having a pH of 5 to 6.

5. In a pressurized container, a composition comprising, on a weight per volume basis, 1 to 15% protease, 5 to 20% propylene glycol, 3 to 17% sodium chloride, and 1 to 44% dextrose in water, and a propellant, said composition having a pH of 5 to 6.

6. The aqueous composition of claim 5 in which the protease is of microbial origin.

7. In a pressurized container, a sprayable gastronomically acceptable composition comprising, on a weight per volume basis, 1 to 15% protease, 5 to 20% propylene glycol, 3 to 17% sodium chloride, and 16 to 32% dextrose in water, and a propellant, said composition having a pH of 5 to 6.

References Cited in the file of this patent

UNITED STATES PATENTS

| | | |
|---|---|---|
| 2,668,771 | Hall | Feb. 9, 1954 |
| 2,774,673 | Young | Dec. 18, 1956 |
| 2,825,654 | Vaupel | Mar. 4, 1958 |
| 2,849,323 | Young | Aug. 26, 1958 |
| 2,857,284 | York | Oct. 21, 1958 |
| 2,926,090 | Williams | Feb. 23, 1960 |